United States Patent
Maddocks et al.

(10) Patent No.: US 9,978,054 B2
(45) Date of Patent: May 22, 2018

(54) ACCEPTANCE QUALITY IMPROVEMENT USING LOCALIZATION DATA TO ADJUST CONTACTLESS PAYMENT

(71) Applicant: MasterCard International Incorporated, Purchase, NY (US)

(72) Inventors: Ian Maddocks, Milton Keynes (GB); David A. Roberts, Warrington (GB); Colin Tanner, Middlesex (GB)

(73) Assignee: Mastercard International Incorporated, Purchase, NY (US)

( * ) Notice: Subject to any disclaimer, the term of this patent is extended or adjusted under 35 U.S.C. 154(b) by 632 days.

(21) Appl. No.: 14/464,428

(22) Filed: Aug. 20, 2014

(65) Prior Publication Data

US 2015/0294299 A1 Oct. 15, 2015

Related U.S. Application Data

(60) Provisional application No. 61/978,414, filed on Apr. 11, 2014.

(51) Int. Cl.
*G06Q 20/20* (2012.01)
*G06Q 20/32* (2012.01)
*G06Q 20/38* (2012.01)

(52) U.S. Cl.
CPC ......... *G06Q 20/3224* (2013.01); *G06Q 20/20* (2013.01); *G06Q 20/204* (2013.01); *G06Q 20/3278* (2013.01); *G06Q 20/38* (2013.01)

(58) Field of Classification Search
None
See application file for complete search history.

(56) References Cited

U.S. PATENT DOCUMENTS

| | | | | |
|---|---|---|---|---|
| 5,844,218 A | * | 12/1998 | Kawan | G06Q 20/341 235/375 |
| 8,046,261 B2 | * | 10/2011 | Ghosh | G06Q 20/045 235/380 |
| 8,706,556 B2 | | 4/2014 | Mestre et al. | |
| 2012/0011065 A1 | * | 1/2012 | Winfield-Chislett | G06Q 20/02 705/42 |

* cited by examiner

*Primary Examiner* — Paul Danneman
(74) *Attorney, Agent, or Firm* — Buckley, Maschoff & Talwalkar LLC

(57) ABSTRACT

A method may include requesting payment infrastructure data from a payment device reader. The method may further includes receiving payment infrastructure data from the payment device reader. The payment infrastructure data that is received may be indicative of a country in which the payment device reader is installed. In addition, the method may include selecting data for transmission to the payment device reader based at least in part on the received payment infrastructure data.

17 Claims, 7 Drawing Sheets

ACCEPTANCE QUALITY IMPROVEMENT USING LOCALIZATION DATA TO ADJUST CONTACTLESS PAYMENT

CROSS REFERENCE TO RELATED APPLICATION

This application claims the benefit of U.S. Provisional Patent Application No. 61/978,414 filed on Apr. 11, 2014, the contents of which are hereby incorporated by reference for all purposes.

BACKGROUND

Payment cards such as credit cards and debit cards are in widespread use. In some environments, payment cards in the form of magnetic stripe cards prevail in terms of popularity. With mag stripe cards, the payment card account number may be read from the card at the point of sale by a magnetic stripe reader, and then submitted with a transaction authorization request to the account issuer via the payment network.

In other environments, it is common to use so-called "contactless" payment cards. With contactless payment cards, the payment card account number is stored in an integrated circuit (IC) within the card, and is read by short-range radio communication between the card and the contactless reader component of a point of sale (POS) device. With enhancements that have occurred to mobile phones, including smartphones, the capability has been added to perform NFC (near field communication) communications to enable so-called "contactless" payment cards to be digitized into these consumer devices. These mobile devices utilize a secure element (SE) to store the payment card account number and associated data, keys and Personal Identification Number (PIN) to enable the consumer to perform a payment transaction using the NFC short-range radio communications provided by the mobile device and the contactless reader component of a POS device. Typically, in the course of a payment transaction using a contactless payment card or a payment-enabled mobile phone, the device in question is tapped at an appropriate spot on the POS device reader component to allow for proximity communications between the payment device and the reader component.

Various protocols exist for performing a transaction between a contactless enabled card or mobile device and the reader component of a POS device. On occasion there can be mismatches between the reader component and other components in the payment acceptance system, such that the reader component may select a payment protocol for a transaction even though that payment protocol is not supported downstream in the electronic cash register (ECR) or point of sale terminal (POS), or merchant acquirer. When this occurs, an attempted payment transaction may be declined rather than accepted, even though the payment-enabled mobile device is in proper working condition and the payment account selected for use is valid and in good standing.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a payment-enabled device interrogates the reader component of a POS device in connection with a payment card account transaction. The payment-enabled device receives data from the reader component that indicates the payment infrastructure in which the reader component is installed. Based on the payment infrastructure data, the payment-enabled device determines whether or not to expose to the reader device all of the payment protocols that the payment-enabled mobile device is configured to perform. The payment-enabled device may suppress a payment protocol that could result in the transaction being unnecessarily declined. To support future compatibility the contactless payment device also requests from the reader data pertinent to the release version of the reader/POS device. In some embodiments, the payment infrastructure is at least partly or potentially determined by the geographic location at which the POS device is installed. Consequently, in some embodiments, the payment infrastructure data may include or consist of data that indicates the geographic location (e.g., the country) in which the POS device is installed.

Figure 1:
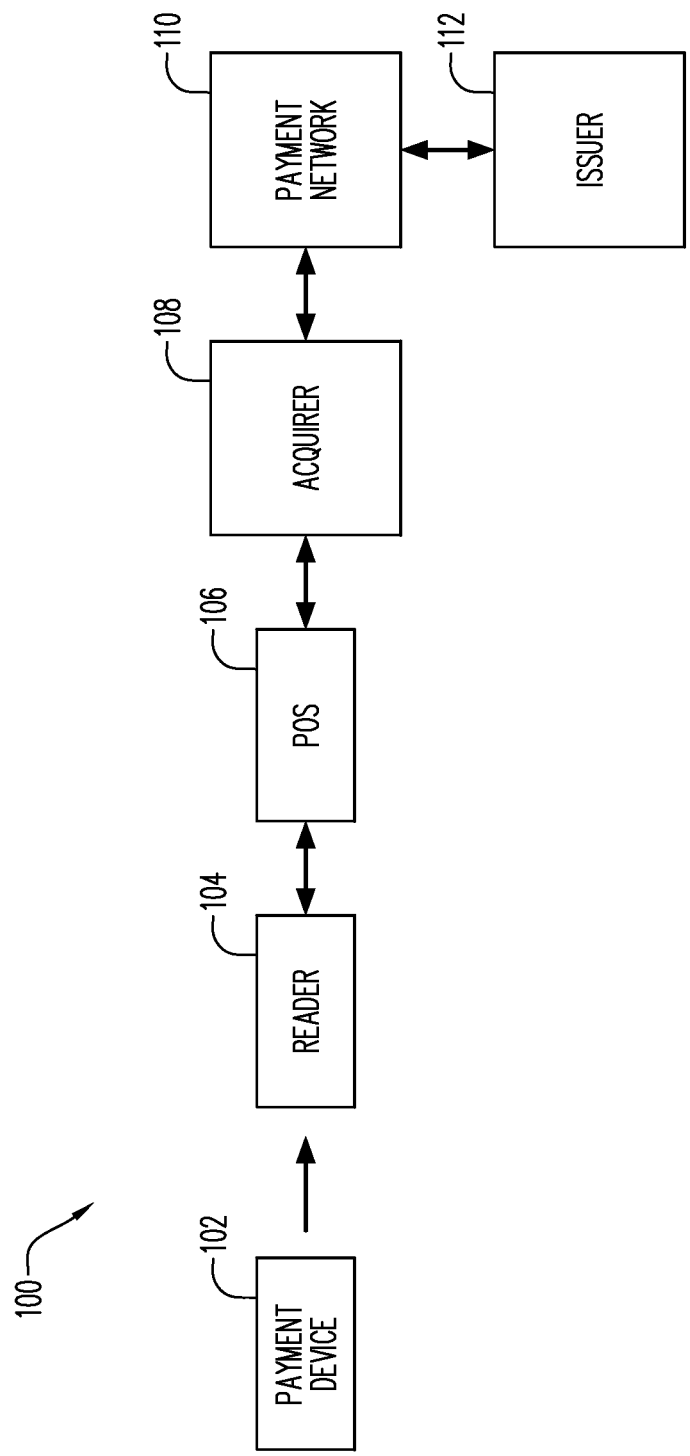
FIG. 1 is a block diagram that illustrates a payment system in which aspects of the present invention may be applied.

FIG. 1 is a block diagram that illustrates a payment system 100 in which aspects of the present invention may be applied.

The system 100 includes a payment device 102 provided in accordance with aspects of the present invention. In some embodiments, the payment device 102 may be constituted by a suitably programmed payment-enabled mobile device (e.g., a smartphone) that stores a payment card account number and runs a payment applet. In other embodiments, or in other circumstances, the payment device 102 may be an IC-based payment card.

The system 100 further includes a reader component 104 associated with a POS device 106. In some known manner (depending on the type of the payment card/device 102) the reader component 104 is capable of reading the payment card account number and other data from the payment device 102. In some embodiments of the payment system 100, the reader component 104 and the POS device may be constituted and programmed according to conventional techniques. The reader component 104 may also be referred to as a "payment device reader" or a "payment transaction terminal".

The reader component 104 and the POS device 106 may be located at the premises of a retail store and operated by a sales associate of the retailer for the purpose of processing retail transactions. The payment device 102 is shown in FIG. 1 to be interacting with the proximity reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS device 106. The acquirer computer 108 may route the authorization request via a payment network 110 to the server computer 112 operated by the issuer of a payment card account that is associated with the payment device 102. As is also well known, the authorization response generated by the payment card issuer server computer 112 may be routed back to the POS device 106 via the payment network 110 and the acquirer computer 108.

One well known example of a payment network is referred to as the "Banknet" system, and is operated by MasterCard International Incorporated, which is the assignee hereof.

The payment card issuer server computer 112 may be operated by or on behalf of a financial institution ("FI") that issues payment card accounts to individual users. For example, the payment card issuer server computer 112 may perform such functions as (a) receiving and responding to requests for authorization of payment card account transactions to be charged to payment card accounts issued by the FI; and (b) tracking and storing transactions and maintaining account records.

The components labeled 104 (payment device reader), 106 (point of sale device) and 108 (acquirer computer), may be referred to as the elements of the payment system 100 concerned with acceptance of payment transactions. A main function of the payment network 110 is routing payment transactions, whereas a main function of the issuer server computer 112 involves authorization of payment transactions. A major aspect of the present invention is concerned with programming the payment device 102 to help assure smooth handling of the acceptance aspect of transactions initiated from the payment device 102, notwithstanding potential mismatches within the acceptance portion of the payment system 100. In some embodiments, all portions of the payment system 100 may be conventionally constituted and programmed apart from the payment device 102.

The components of the system 100 as depicted in FIG. 1 are only those that are needed for processing a single transaction. A typical payment system may process many purchase transactions (including simultaneous transactions) and may include a considerable number of payment card issuers and their computers, a considerable number of acquirers and their computers, and numerous merchants and their POS devices and associated payment device reader components. The system may also include a very large number of payment card account holders, who carry payment-enabled mobile devices, payment cards or other devices for initiating payment transactions by presenting an associated payment card account number to the reader component of a POS device.

As is well known to those who are skilled in the art, among the numerous payment device readers in a typical practical embodiment of the payment system 100, there may be variations in hardware and/or software configurations, and particularly in terms of the readers' capabilities for handling various payment transaction protocols. The same can also be said about the numerous POS devices 106 and acquirer computers 108 that make up a typical practical embodiment of the payment system 100. Thus it can be said that at least in the acceptance portion of the payment system 100, there can be a lack of uniformity among the constituent devices. Aspects of the present invention are intended to remedy (via features provided in the payment device 102) disadvantages that may arise from this lack of uniformity.

Figure 2:
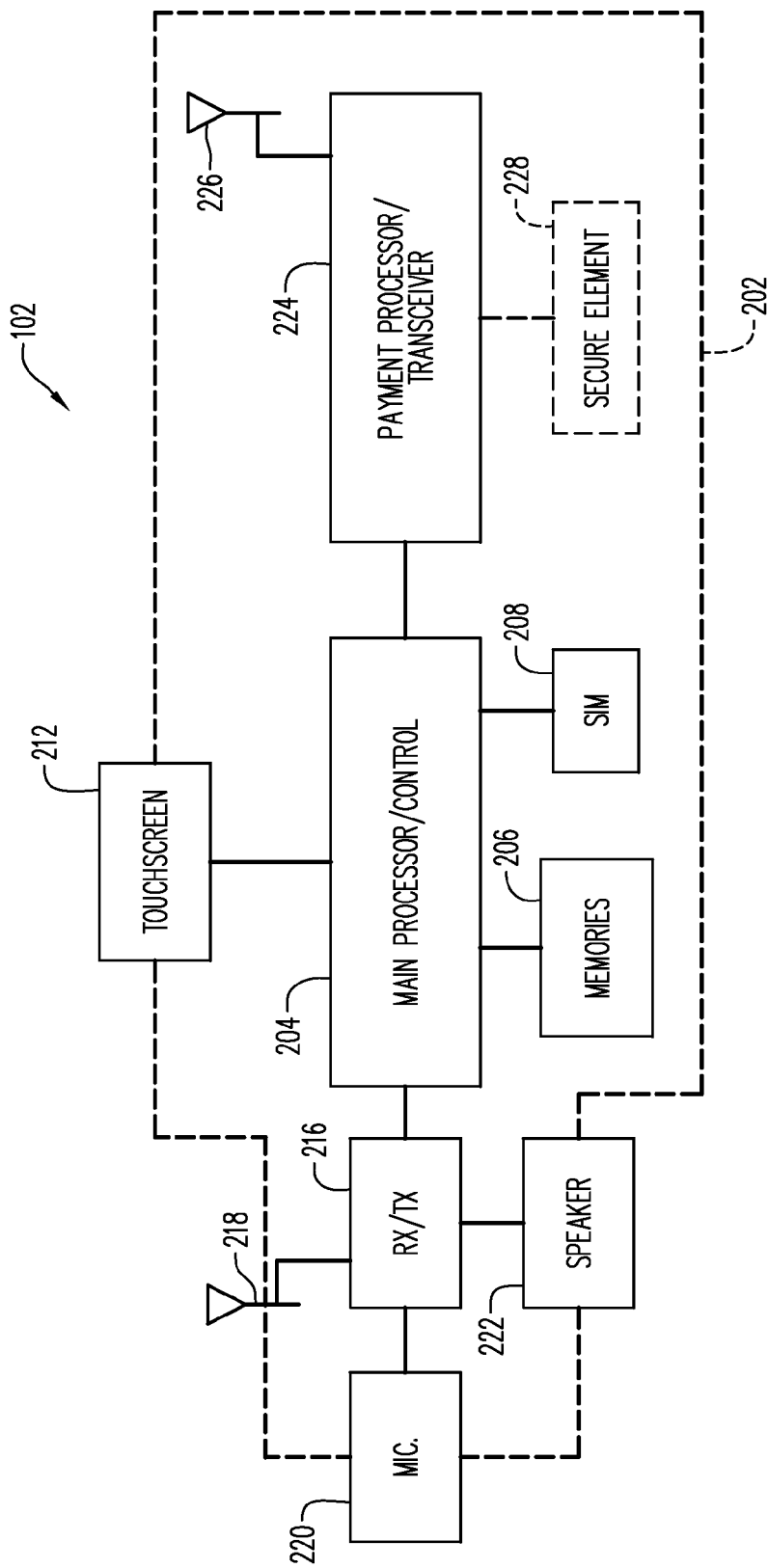
FIG. 2 is a block diagram that illustrates one example of a payment-enabled device provided in accordance with aspects of the present invention and that may be used in connection with the system of FIG. 1.

FIG. 2 is a block diagram that illustrates an example embodiment of the payment device 102 shown in FIG. 1 and provided in accordance with aspects of the present invention. The payment device 102 may be conventional in its hardware aspects. For example, the payment device 102 may be a smartphone, and may resemble, in some or all of its hardware aspects and many of its functions, the numerous smartphone models that support NFC such as those running the "Android" operating system. Alternatively, the payment device 102 may be a tablet computer, such as the "iPad" marketed by Apple Inc. The ensuing description of the payment device 102 is based on the assumption that it is embodied as a smartphone; those who are skilled in the art will readily understand from the following description, and from following descriptions of software aspects of the payment device 102, how to embody the payment device 102 as a tablet computer or other device apart from a smartphone. A subsequent portion of this disclosure will describe hardware aspects of a payment card that may embody aspects of the present invention as an alternative embodiment of the payment device 102.

The payment device 102 may include a conventional housing (indicated by dashed line 202 in FIG. 2) that contains and/or supports the other components of the payment device 102. The housing 202 may be shaped and sized to be held in a user's hand, and may for example exhibit the type of form factor that is common with the current generation of smartphones.

In the case where the payment device 102 is a mobile device, the device 102 further includes conventional control circuitry 204, for controlling over-all operation of the payment device 102. For example, the control circuitry 204 may include a conventional processor of the type designed to be the "brains" of a smartphone.

Other components of the payment device 102 (when the functionality is embodied in a mobile device), which are in communication with and/or controlled by the control circuitry 204, include: (a) one or more memory devices 206 (e.g., program and working memory, etc.); (b) a conventional SIM (subscriber identification module) card 208; (c) a conventional touchscreen 212 which serves as the primary input/output device for the payment device 102, and which thus receives input information from the user and displays output information to the user. As is the case with many models of smartphones, in some embodiments the payment device 102 may also include a few physically-actuatable switches/controls (not shown), such as an on/off/reset switch, a menu button, a "back" button, a volume control switch, etc.

The mobile payment device 102 also includes conventional receive/transmit circuitry 216 that is also in communication with and/or controlled by the control circuitry 204. The receive/transmit circuitry 216 is coupled to an antenna 218 and provides the communication channel(s) by which the payment device 102 communicates via the mobile telephone communication network (not shown). The receive/ transmit circuitry 216 may operate both to receive and transmit voice signals, in addition to performing data communication functions. As is known to those who are skilled in the art, such data communication may be via HTTP (HyperText Transfer Protocol) or other communication protocol suitable for carrying out data communication over the internet.

The mobile payment device 102 further includes a conventional microphone 220, coupled to the receive/transmit circuitry 216. Of course, the microphone 220 is for receiving voice input from the user. In addition, a loudspeaker 222 is included to provide sound output to the user, and is coupled to the receive/transmit circuitry 216. The sound output may be, at least on some occasions, an audible reproduction of voice signals received by the device 102 via a conventional mobile communications network (not shown).

The receive/transmit circuitry 216 may operate in a conventional fashion to transmit, via the antenna 218, voice signals generated by the microphone 220, and to reproduce, via the loudspeaker 222, voice signals received via the antenna 218. The receive/transmit circuitry 216 may also handle transmission and reception of text messages and other data communications via the antenna 218.

The payment device 102 may also include circuitry 224 that is partly or wholly dedicated to implementing NFC communications functionality of the payment device 102. The payment device 102 may further include a loop antenna 226, coupled to the NFC circuitry 224. In some embodiments, the NFC circuitry 224 may partially overlap with the control circuitry 204 for the payment device 102. Moreover, the NFC circuitry 224 is associated with, and may also overlap with, a secure element 228 that is part of the payment device 102 and is contained within the housing 202. The term "secure element" is well known to those who are skilled in the art, and typically refers to a device that may include a small processor and volatile and nonvolatile memory (not separately shown). In some embodiments, the secure element 228 may be provided as part of the SIM card 208. In other embodiments, the secure element 228 may be constituted by an integrated circuit card separate from the SIM card 208 but possibly having the same form factor as the SIM card 208. In some embodiments of the payment device 102, the secure element 228 may be conventional in its hardware aspects but may be programmed in accordance with aspects of the present invention in a manner to be described below. It should be noted that the term "secure element" is not intended to be limited to devices that are IC-based, but rather may also include any secure execution environment in a mobile device, and may include software based secure execution environments running on the main mobile device processor.

In other embodiments, the functionality operating in the secure element may be cloud based, i.e., software on the payment device supported by remote server functions (not shown).

It should also be understood that the mobile payment device 102 may be operable as a conventional mobile telephone for communication—both voice and data—over a conventional mobile telecommunications network, which is not depicted in the drawing. Thus, the mobile payment device 102 may be in communication from time to time in a conventional manner with a mobile network operator ("MNO"—also not shown). For example, an over-the air communication channel may be established between the payment device 102 and a remote computer (e.g., the issuer server computer 112 (FIG. 1)).

Apart from software aspects of the present invention (as most specifically described below in example form in connection with FIG. 5), the payment device 102 may be programmed in a generally conventional manner, even in regard to its payment capabilities. For example, one or more payment applets may be loaded to, and may run on, the secure element 228 (FIG. 2). At least one of the payment applets may incorporate software features in accordance with aspects of the present invention as described below. Conventional software to host the payment applet(s) may also run on the payment device 102. Thus a payment device programmed as described herein may incorporate a processor and a memory device in communication with the processor, with the memory device storing program instructions for controlling the processor to provide functionality as described herein.

Figure 3:
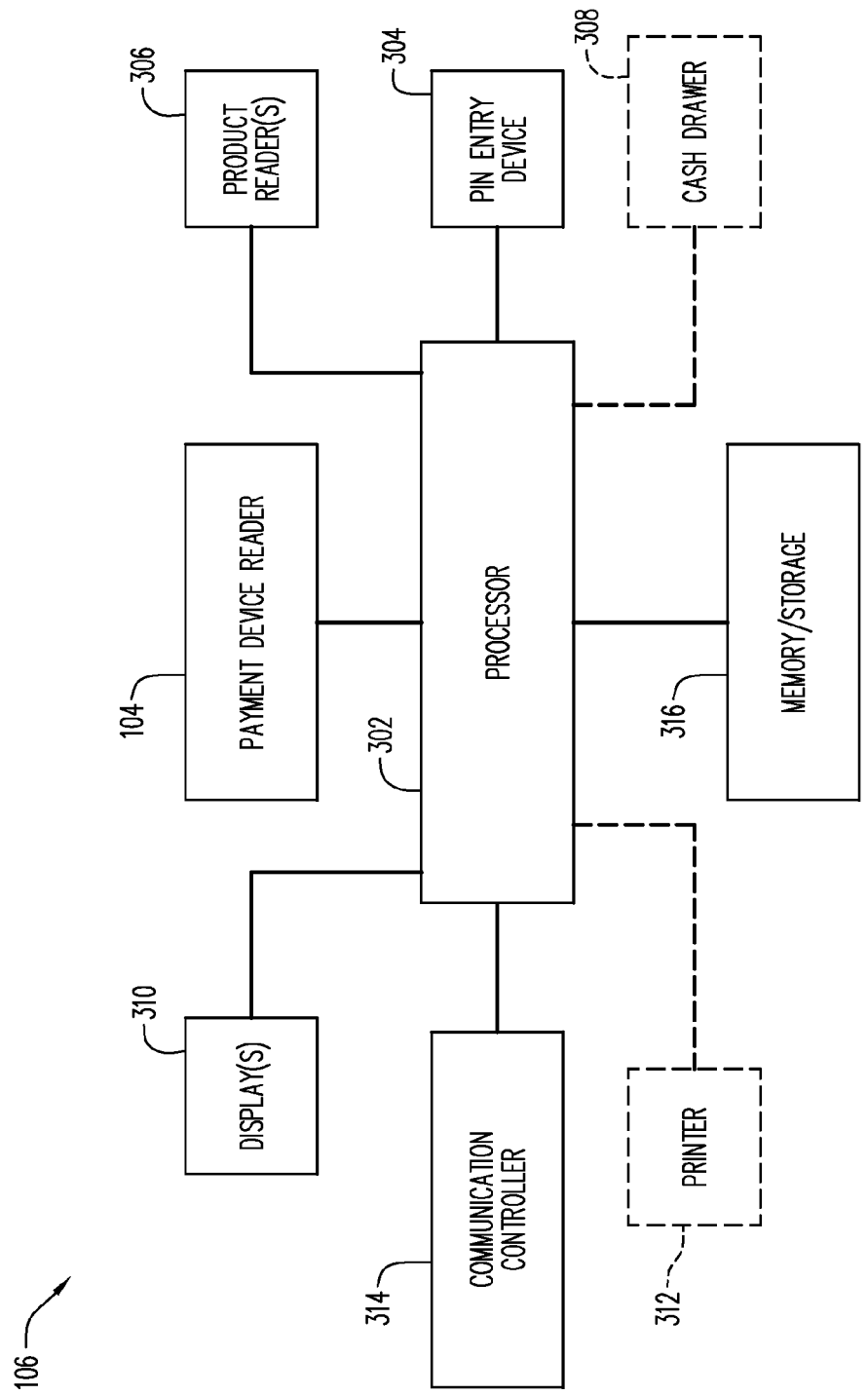
FIG. 3 is a block diagram that illustrates a point of sale (POS) terminal and associated payment device reader that may be part of the system of FIG. 1.

FIG. 3 is a block diagram that illustrates the POS device 106 shown in FIG. 1, together with its associated payment device reader component 104. As noted above, the POS device 106 and payment device reader component 104 may be constituted in an entirely conventional manner, and may—in any particular installation—reflect one of a number of different commercial hardware and software configurations suitable for the function of performing contactless payment transactions. It may be the case that the hardware and/or software aspects of the POS device 106 and/or the payment device reader component 104 may have been type-certified for use in payment transaction applications. A brief description of hardware aspects of the POS device 106 and the payment device reader component 104 will follow, with continued reference to FIG. 3.

The POS device 106 may include a processing element (or elements) such as the processor 302 shown in FIG. 3. The processor 302 may, for example, be a conventional microprocessor, and may operate to control the overall functioning of the POS device 106.

The POS device 106 may also include conventional peripheral components, in communication with and/or controlled by the processor 302, such as: (a) a data entry device 304 for receiving input (e.g., a PIN) from a user who is interacting with the POS terminal; (b) a product reader 306 for reading any form of unique product identifier, such as a barcode or RFID, that appears on, or is attached to, products brought to the terminal for purchase; (c) a cash drawer 308 for storing cash received from customers; (d) one or more displays 310 for providing output (e.g., identifying products presented for purchase and their prices, indicating sales tax due, indicating transaction subtotals and totals, etc., providing prompts to the customer and/or to the sales associate); (e) a printer 312 for printing out sales receipts; and (f) a communication controller 314 for allowing the processor 302, and hence, the POS device 106 to engage in communication over data networks with other devices (e.g., the acquirer computer 108, FIG. 1). (In some embodiments, at least one of the displays 310 may be a touch screen, so as to provide an input function as well as an output function.)

In addition, the POS device 106 may include one or more memory and/or data storage devices (indicated collectively at 316), which may comprise any combination of one or more of a hard disk drive, RAM (random access memory), ROM (read only memory), flash memory, etc. The memory/data storage device(s) 316 may store software and/or firmware that programs the processor 302 and the POS device 106 to provide desired functionality. The memory/data storage device(s) 316 may be in communication with the processor 302. Further, the POS device 106 may include one or more housings (not shown) which contain and/or support one or more of the other components shown in FIG. 3.

In some cases, the reader component 104 of the POS device 106 includes NFC capabilities to allow it to engage in contactless transactions with a payment device 102 such as that described above in connection with FIG. 2. It is an advantage of the present invention that novel behavior of the payment device 102 may affect the functioning of conventional software in the payment device reader component 104 and/or the POS device 106 such that payment transactions that would otherwise (and inappropriately) be declined, will instead transact successfully.

In addition to or instead of the NFC capabilities referred to above, the reader component 104 may also include capabilities for reading contactless and/or contact IC-based payment cards; in addition or alternatively, the reader component 104 may also be configured to read conventional magnetic stripe payment cards.

Figure 4:
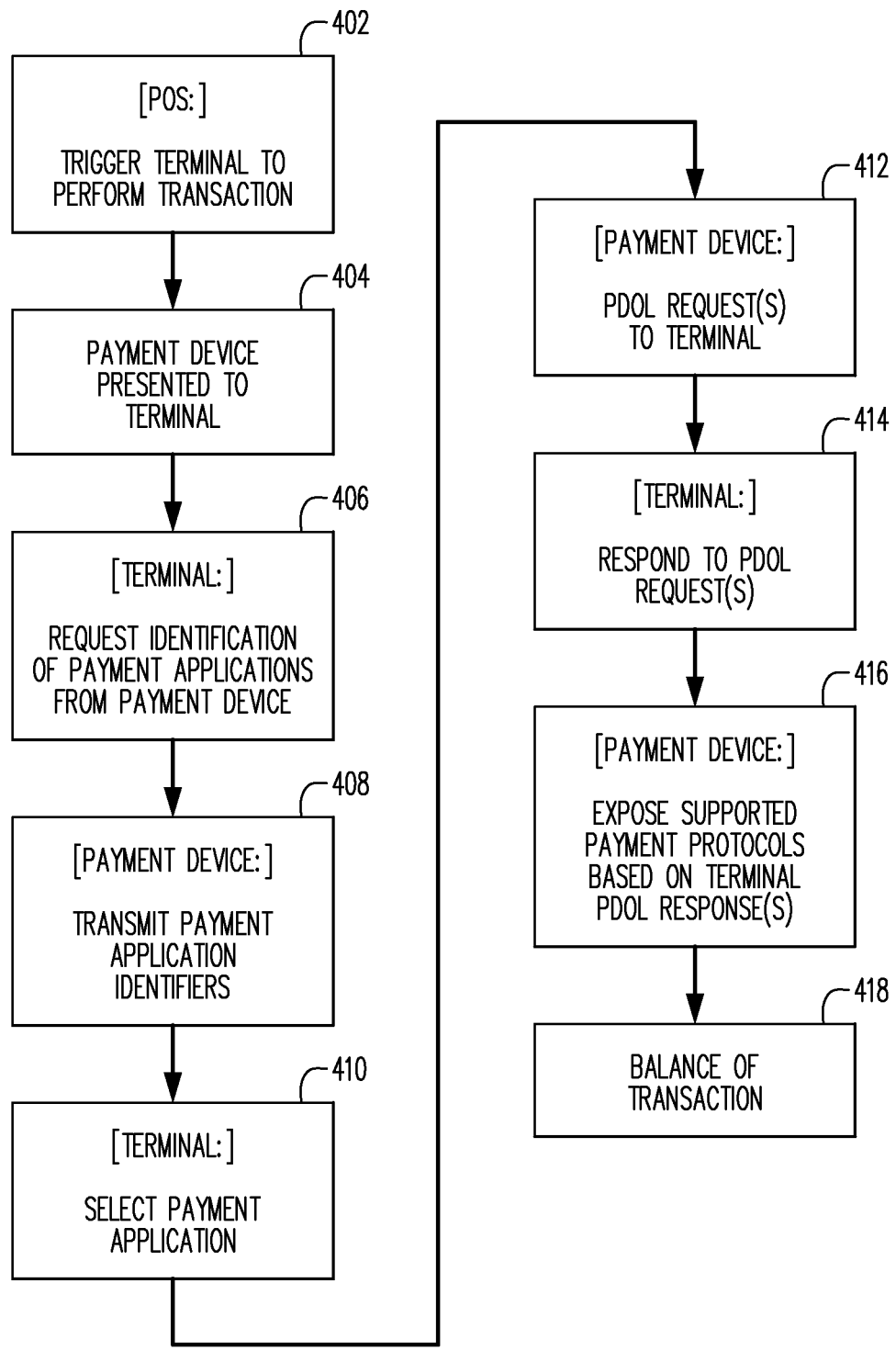
FIG. 4 is a flow chart that illustrates a transaction process that may be performed in the system of FIG. 1 in accordance with aspects of the present invention.

FIG. 4 is a flow chart that illustrates a transaction process that may be performed in the payment system 100 of FIG. 1 in accordance with aspects of the present invention.

Prior to the process stages illustrated in FIG. 4, a customer (not shown; i.e., the user of the payment device 102) may visit a retail store and select merchandise and present it for purchase at a point-of-sale counter. Transaction data may be input into the POS device 106, at the point-of-sale counter. This may occur, for example, by the product reader 306 of the POS device 106 scanning barcodes on the merchandise to allow input to the POS device 106 of the identifiers of the merchandise items and also to allow for lookup by the POS device 106 of price data for the merchandise items. The sales associate/human operator for the POS device 106 may enter an indication that no more items are to be included in the transaction, and then the POS device 106 may calculate a total amount for the purchase transaction. At this point the process of FIG. 4 may commence (block 402) with the POS device 106 triggering the payment device reader component 104 (also referred to as the "terminal") to perform a payment-device-based payment transaction. At 404, the customer/user presents the payment device 102 to the payment device reader component 104 by (e.g.) tapping the payment device 102 at an appropriate spot on the housing (not separately shown) of the payment device reader component 104.

At 406, the payment device reader component 104 may request that the payment device 102 identify the payment applications stored thereon. According to some known processes, this may occur by invoking a PPSE (proximity payment systems environment) discovery application.

In response, at 408, the payment device 102 may transmit, to the payment device reader component 104, data that identifies the payment applications with which the payment device 102 has been provisioned. In some technical environments, this data is in the form of AIDs (application identifiers).

Next, at 410, the payment device reader component 104 may select one of the payment applications by transmitting to the payment device 102 a particular AID corresponding to the selected payment application.

At 412, and in accordance with known techniques, the payment device 102 may request data from the payment device reader component 104. This may be done via PDOL (processing options data object list). The data requested from the payment device reader component 104 by the payment device 102 may include payment infrastructure data that is indicative of a type of payment infrastructure of which the payment device reader is a part. The payment infrastructure data, in some embodiments, may include a country code that indicates the country in which the payment device reader component 104/POS device 106 are installed, and an indication of the payment device reader component's product and/or software release version.

At 414, the payment device reader component 104 responds to the request by providing the requested data, assumed in this case to include the above-mentioned country code and version indicator.

At 416, the payment device 102 considers the data provided by the payment device reader component 104 and, based on that data, determines what payment protocol data to provide to the payment device reader component 104.

Figure 5:
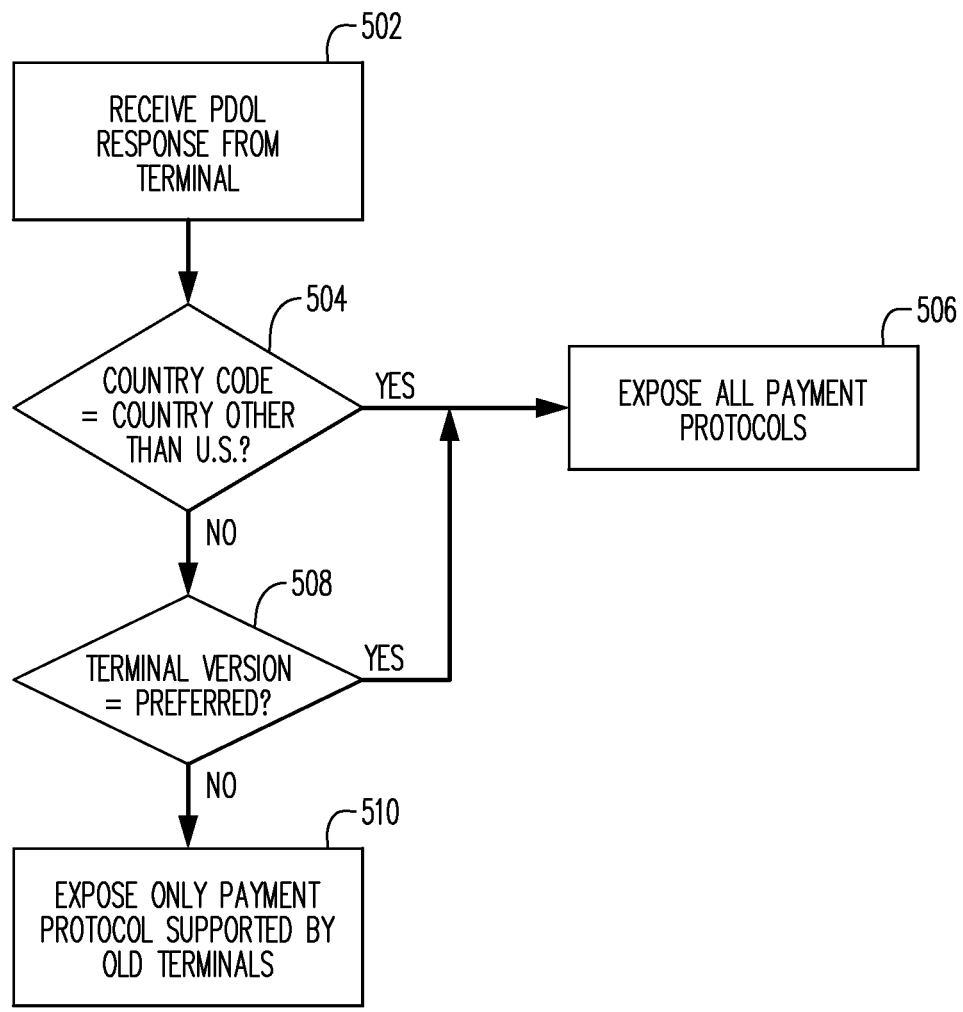
FIGS. 5 and 6 are flow charts that illustrate details of the process of FIG. 4.

FIG. 5 is a flow chart that provides details of the process stage indicated at 416 in FIG. 4. Thus the process stages illustrated in FIG. 5 are performed by the payment device 102 (e.g., by the payment application selected by the payment device reader component 104 at 410).

Referring now to FIG. 5, at 502 the payment device 102 receives the responses provided by the payment device reader component 104. As noted above, this data may include a country code that indicates the geographic location where the payment device reader component 104/POS device 106 is installed (i.e., where the purchase transaction is taking place), and data that indicates a release version for the payment device reader component 104/POS device 106.

It should be noted at this point that the selected payment application in the payment device 102 may feature more than one payment protocol that the payment device 102 supports. For example, data indicative of the supported payment protocols may be stored in the payment device 102 (in association with the payment application) in a payment protocol profile for the payment application. In some embodiments, for example, the payment device 102 may support two payment protocols. For example, one of the two protocols may be the well-known "PayPass MChip" protocol (sometimes referred to hereinafter as "EMV") published by MasterCard International Incorporated, the assignee hereof. The other of the two protocols may be the well-known "PayPass Mag Stripe" protocol (sometimes referred to hereinafter as "MagStripe"), also published by MasterCard International Incorporated. Alternative similar protocols also exist, including "qVSDC" (sometimes referred to as "EMV") and MagStripe Data (sometimes referred to as "MSD"), both published by Visa.

Returning to FIG. 5, decision block 504 may follow block 502. At decision block 504, the payment device 102 may determine whether the country code received from the payment device reader component 104 is indicative of a known country that is not the United States. If a positive determination is made at decision block 504, then the process of FIG. 5 may advance from decision block 504 to block 506. If a negative determination is made at decision block 504 (i.e., if the country code either is unknown or corresponds to the U.S.), then the process of FIG. 5 may advance from decision block 504 to decision block 508. At decision block 508, the payment device 102 may determine whether the version indication data received from the payment device reader component 104 indicates that the payment device reader component 104 corresponds to a preferred version (e.g., the most up to date current version). If a positive determination is made at decision block 508, then the process of FIG. 5 may advance from decision block 508 to block 506. If a negative determination is made at decision block 508, then the process of FIG. 5 may advance from decision block 508 to block 510.

If the process of FIG. 5 is performed such that block 506 is reached, then the payment device 102 may report to the payment device reader component 104 that the payment device 102 supports both the EMV and MagStripe payment protocols. If the process of FIG. 5 is performed such that block 510 is reached, then the payment device 102 may report to the payment device reader component 104 that the payment device 102 supports only the MagStripe payment protocol. Thus, in the latter situation, the payment device 102 may suppress the EMV payment protocol, at least in regard to the data transmitted in this instance from the payment device 102 to the payment device reader component 104. It will be appreciated that this process entails the payment device 102 selecting data to be transmitted to the payment device reader component 104. That is, the payment device 102 selects payment protocol data for transmission based on the location data and version data received by the payment device 102 from the payment device reader component 104 at block 502 in FIG. 5.

In either of block 506 or block 510, as the case may be, the reporting of the payment protocol data may be in the form of an AIP (application interchange profile) transmission from the payment device 102 to the payment device reader component 104.

Summarizing the combined effect of the operation of decision blocks 504 and 508, the following case statements may be made.

If the country code is unknown and the reader version is not the preferred version, then the payment device 102 exposes only the MagStripe protocol to the payment device reader component 104.

If the country code corresponds to the U.S. and the reader version is not the preferred version, then the payment device 102 exposes only the MagStripe protocol to the payment device reader component 104.

If the country code corresponds to a known country other than the U.S. and the reader version is not the preferred version, then the payment device 102 exposes both the EMV and MagStripe protocols to the payment device reader component 104.

If the country code corresponds to the U.S. and the reader version is the preferred version, then the payment device 102 exposes both the EMV and MagStripe protocols to the payment device reader component 104.

If the reader version is the preferred version, then the payment device 102 exposes both the EMV and MagStripe protocols to the payment device reader component 104, regardless of the country code.

Thus it can be seen that via the process of FIG. 5, the payment device 102 may filter capabilities (particularly in this example protocol profile data (PDOL)) based on the location and version data, in this example, data provided to it from the payment device reader component 104, and the payment device 102 then transmits the filtered selected data to the payment device reader component 104. By suppressing one of its supported payment protocols under certain circumstances (e.g., when there is doubt as to whether using that protocol would have a good outcome), the payment device 102 may force the other protocol to be used for the current payment transaction. This may increase the likelihood of the payment transaction being handled satisfactorily by the acceptance portion of the payment system 100.

Referring once more to FIG. 4, the process of FIG. 4 may advance from block 416 to block 418. At block 418, with the payment device 102 having exposed one or more payment protocols to the payment device reader component 104, the current payment transaction may proceed and be completed in accordance with conventional practices.

Figure 6:
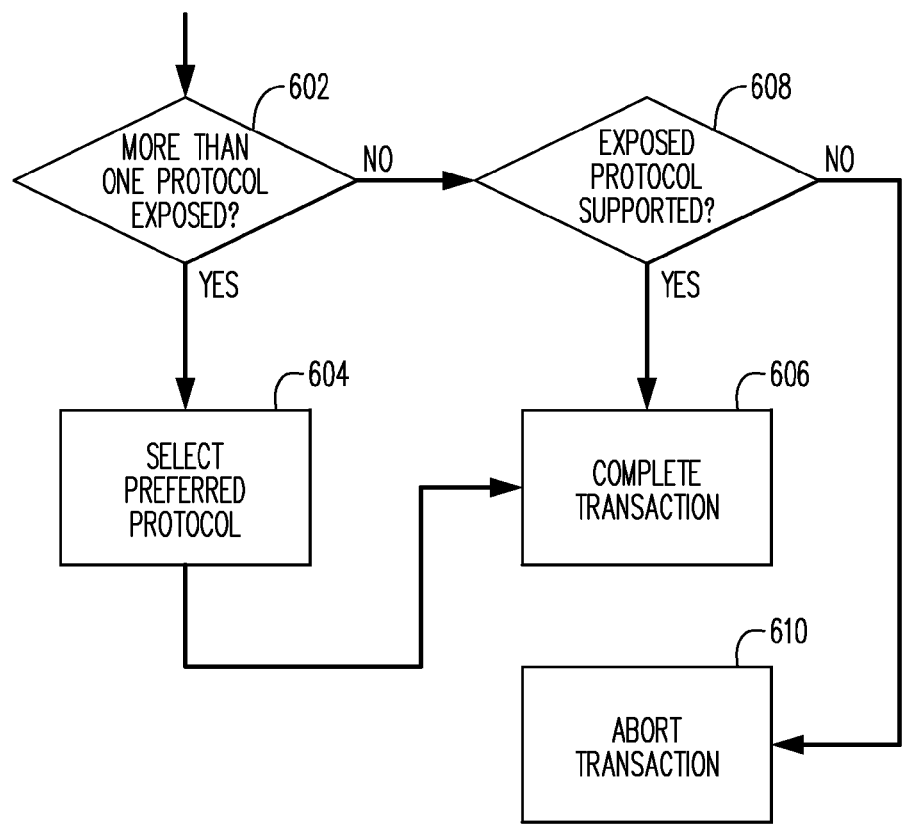

FIG. 6 is a flow chart that illustrates a process that may be carried out by the payment device reader component 104 as part of the completion of the transaction as per block 418 in FIG. 4. The behavior of the payment device reader component 104, as illustrated in FIG. 6, is entirely consistent with conventional programming that is applied to the payment device reader component 104.

Referring to FIG. 6, at a decision block 602, the payment device reader component 104 may determine whether the payment device 102 has exposed more than one payment protocol at block 416 in FIG. 4. If so, then block 604 may follow decision block 602. At block 604, the payment device reader component 104 may select one of the payment protocols. The payment device reader component 104 may do this in accordance with customary considerations for such a step. Then, at block 606, the transaction may be completed using the selected payment protocol, with the customary exchange of messages between the payment device reader component 104 and the payment device 102. That exchange of messages may include the payment device 102 transmitting a PAN (primary account number) or a substitute therefor (e.g., a token) to the payment device reader component 104.

Considering again decision block 602, if a negative determination is made at decision block 602 (i.e., if the payment device reader component 104 determines that the payment device 102 has exposed only one payment protocol), then the process of FIG. 6 may advance from decision block 602 to decision block 608. At decision block 608, the payment device reader component 104 may determine whether it supports the payment protocol exposed by the payment device 102. If so, then the process of FIG. 6 may advance from decision block 608 to block 606. From the previous discussion of block 606, it will be understood that the transaction proceeds using the payment protocol that was exposed by the payment device 102.

Considering again decision block 608, if a negative determination is made at decision block 608 (i.e., if the payment device reader component 104 does not support the single payment protocol exposed by the payment device 102), then the payment device reader component 104 may abort the transaction, as indicated at block 610. It can be anticipated, however, that this outcome will be rather rare.

Another logical possibility, not directly addressed by FIG. 6, is that the payment device 102 may expose two or more payment protocols, none of which are supported by the payment device reader component 104. In this case, the payment device reader component 104 may decline the transaction, but again it can be anticipated that this outcome will be rather rare.

In example processes as described above, the payment device 102 considered both geographic location data and reader version data in selecting which payment protocol data to transmit to the payment device reader component 104. However, in other embodiments, the payment device 102 may consider only the geographic location data or only the reader version data for that purpose.

In example processes as described above, the payment device 102 selected payment protocol data to transmit to the payment device reader component 104 based at least in part on geographic location data that the payment device 102 received from the payment device reader component 104. However, in other embodiments, the payment device 102 may select one or more other types of data for transmission to the payment device reader component 104 based on the geographic location data, instead of or in addition to selecting payment protocol data.

Figure 7:
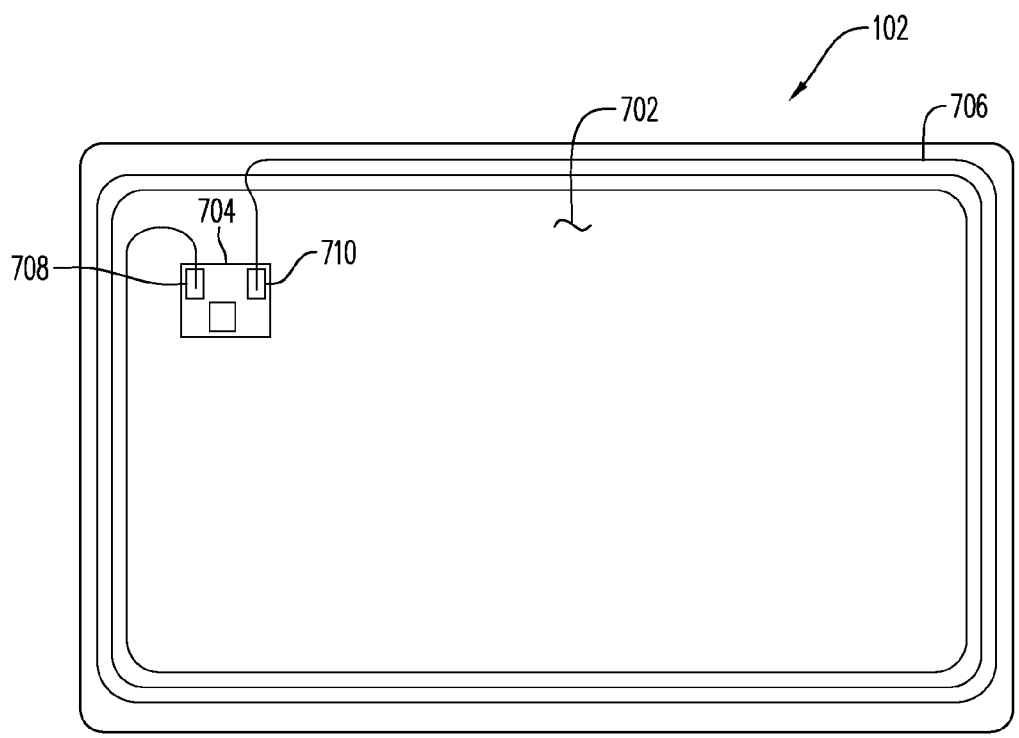
FIG. 7 is a schematic plan view of a payment IC card that may operate as an embodiment of a payment device shown in FIG. 1.

Instead of being embodied as a payment-enabled smartphone or other payment-enabled mobile device, the payment device described herein may alternatively be in the form of a contactless or contact payment IC card. FIG. 7 is a schematic plan view of a payment IC card that may operate as an embodiment of a payment device 102. In particular, the payment card/payment device 102 shown in FIG. 7 may include a card-shaped plastic body 702. The plastic body 702 may be sized and shaped in accordance with a standard form factor for payment cards. An IC 704 may be embedded in and/or mounted on the plastic body 702. The IC 704 may be coupled to a loop antenna 706 via contacts 708, 710. The antenna 706 may also be embedded in the plastic body 702.

Figure 8:
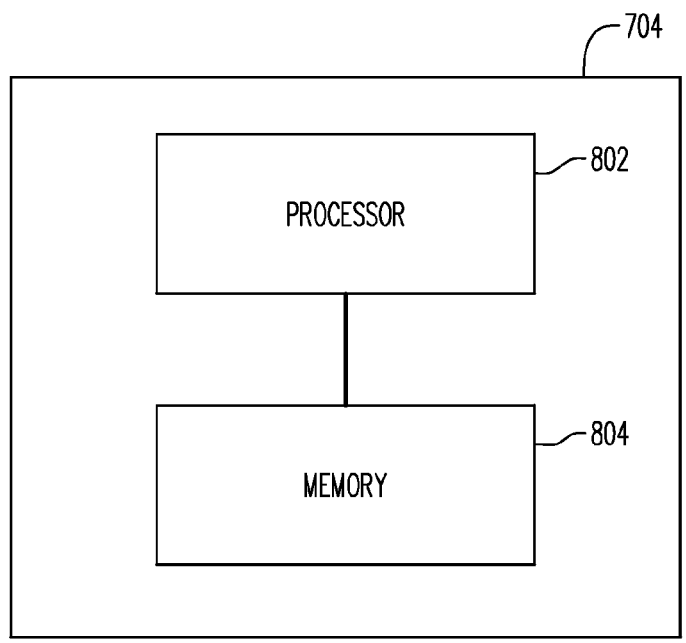
FIG. 8 is a high level block diagram of hardware aspects of an IC that is part of the payment card of FIG. 7.

FIG. 8 is a high level block diagram of hardware aspects of the IC 704. The IC 704 may include a processor component 802 and a memory device 804 in communication with the processor 802. The memory device 804 may store program instructions such that the payment card/payment device 102 functions as described herein. For example, the processor component 802 may be programmed to provide functionality as described above in connection with FIGS. 4 and 5.

In FIG. 7, the payment card/payment device 102 has been depicted as a contactless payment card. In addition or alternatively the payment card/payment device 102 may include electrically conductive contacts situated in a conventional manner on the plastic body 702 such that the payment card/payment device 102 may alternatively or in addition function as a contact payment card.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
    requesting payment infrastructure data from a payment device reader;
    receiving reader payment infrastructure data from the payment device reader, the received payment infrastructure data indicative of a payment infrastructure in which the payment device reader is installed; and
    selecting data for transmission to the payment device reader based at least in part on the received payment infrastructure data;
    wherein:
    the payment infrastructure data includes reader location data that is indicative of a country in which the payment device reader is installed; and
    the selected data indicates at least one payment protocol that is supported by a payment device.

2. The method of claim 1, wherein the payment device suppresses at least one of its capabilities in response to the received reader location data.

3. The method of claim 1, wherein the payment device is a payment-enabled mobile device or plastic card.

4. The method of claim 1, further comprising:
    requesting reader version data from the payment device reader;
    receiving reader version data from the payment device reader, the received reader version data indicative of software capabilities of the payment device reader; and
    said selecting of data is based in part on the received reader version data.

5. The method of claim 1, wherein:
    the requesting step includes transmitting a PDOL (processing options data object list) request to the payment device reader.

6. The method of claim 1, wherein:
    the requesting and receiving steps include wireless communications with the payment device reader.

7. A payment device comprising:
    a processor; and
    a memory in communication with the processor, the memory storing program instructions for controlling the processor, the processor operative with the program instructions to:
    request payment infrastructure data from a payment device reader;
    receive the reader payment infrastructure data from the payment device reader, the received payment infrastructure data indicative of a payment infrastructure in which the payment device reader is installed;
    select protocol data based at least in part on the received payment infrastructure data and
    transmit the selected protocol data to the payment device reader, the transmitted protocol data indicative of at least one payment protocol supported by the payment device;

wherein the payment infrastructure data includes reader location data that is indicative of a country in which the payment device reader is installed.

8. The payment device of claim 7, wherein the transmitted protocol data indicates no more than one payment protocol supported by the payment device, the payment device being configured to support more than one payment protocol.

9. The payment device of claim 7, further comprising:
a housing that contains the processor and the memory;
a microphone supported on the housing; and
a speaker supported on the housing, the speaker for audibly reproducing voice signals received via a mobile communications network.

10. The payment device of claim 7, further comprising:
a card-shaped plastic body that supports the processor and the memory.

11. A method comprising:
a POS (point of sale) device triggering a payment device reader to initiate a transaction;
the payment device reader requesting that a payment device transmit payment application data;
the payment device transmitting the payment application data to the payment device reader;
the payment device reader selecting a payment application based on the payment application data received from the payment device;
the payment device requesting file control data from the payment device reader via at least one PDOL (processing options data object list) request;
the payment device receiving, from the payment device reader, data indicative of (a) a payment infrastructure in which the payment device reader is installed; and (b) a release version of the payment device reader;
the payment device having stored therein a protocol profile containing a first protocol identifier and a second protocol identifier;
the payment device suppressing the first protocol identifier in response to the data received by the payment device from the payment device reader;
the payment device transmitting, to the payment device reader, only the second protocol identifier from the payment device's protocol profile; and
the payment device reader handling the transaction with the payment device in accordance with a payment protocol identified by the second protocol identifier.

12. The method of claim 11, wherein the payment infrastructure data includes reader location data that is indicative of a country in which the payment device reader is installed.

13. The method of claim 12, wherein the payment device is a payment-enabled mobile device or plastic card.

14. The method of claim 12, wherein the received data indicative of the release version of the payment device reader indicates that the release version is not a current release version.

15. The method of claim 12, wherein the POS device, the payment device reader and the payment device are located at a retail store.

16. The method of claim 12, wherein at least the receiving steps and the transmitting steps include short-range wireless communications between the payment device and the payment device reader.

17. The method of claim 16, wherein the short-range wireless communications are performed in accordance with the NFC (near field communication) standard communication protocol.

* * * * *